United States Patent

[11] 3,597,605

| [72] | Inventors | John R. Kane<br>Piffard;<br>Daniel Harvey Robbins, Rochester, both of, N.Y. |
|---|---|---|
| [21] | Appl. No. | 829,410 |
| [22] | Filed | June 2, 1969 |
| [45] | Patented | Aug. 3, 1971 |
| [73] | Assignee | Itek Corporation<br>Lexington, Mass. |

[54] SYSTEM FOR ILLUMINATING A LARGE MICROFILM COPY BOARD
18 Claims, 2 Drawing Figs.

[52] U.S. Cl. .................................................. 240/2 P,
240/46.31, 240/51.11
[51] Int. Cl. .................................................. F21v 33/00
[50] Field of Search .......................................... 240/2 C, 2
D, 2 P, 51.11, 46.31, 46.33, 46.35, 46.37; 355/69, 70, 71

[56] References Cited
UNITED STATES PATENTS
2,629,813  2/1953  Murphy ....................... 240/1.3
3,119,301  1/1964  Beattie et al. ................. 355/70 X
3,127,112  3/1964  McCammon et al. ........ 240/1.3

Primary Examiner—Samuel S. Matthews
Assistant Examiner—Kenneth C. Hutchison
Attorneys—Homer O. Blair, Robert L. Nathans and William C. Roch ABSTRACT: A copy board illumination system to control the light distribution at various portions of the copy board. A lighting fixture is provided in an elevated position above each of the two ends of the copy board. Each fixture is divided into three zones along the length of the fixture. The two end zones each have a plurality of vertical baffles which control the distribution of illumination between each edge of the copy board and the center of the copy board. The center zone illuminates the center of the copy board and has vertical baffling which is slidable along the length of the fixture and controls the illumination on the center of the copy board. A horizontally slidable baffle is provided beneath each of the three zones and controls the distribution of illumination between the end and center of the copy board.

PATENTED AUG 3 1971
3,597,605
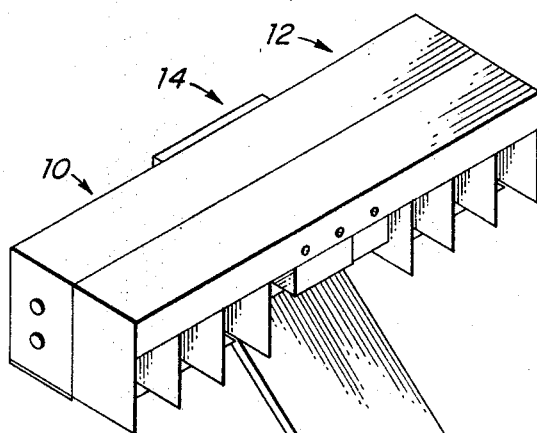
FIG. 1.
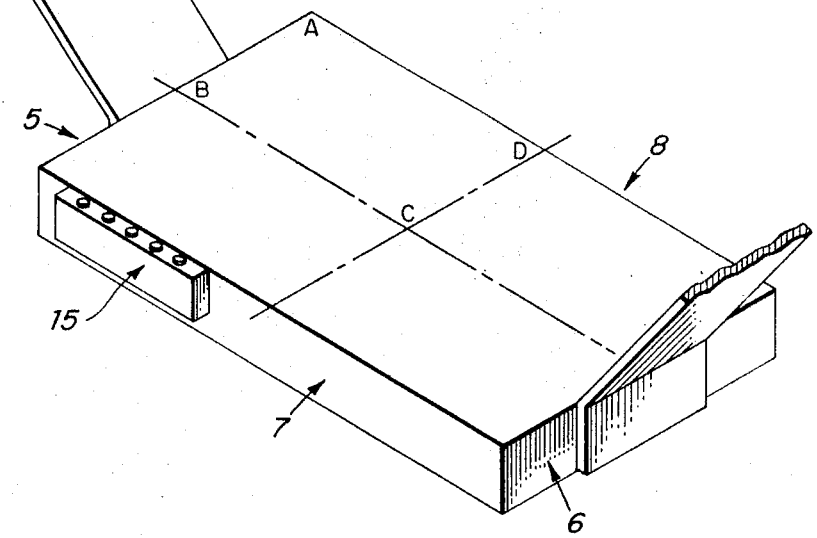
FIG. 2.
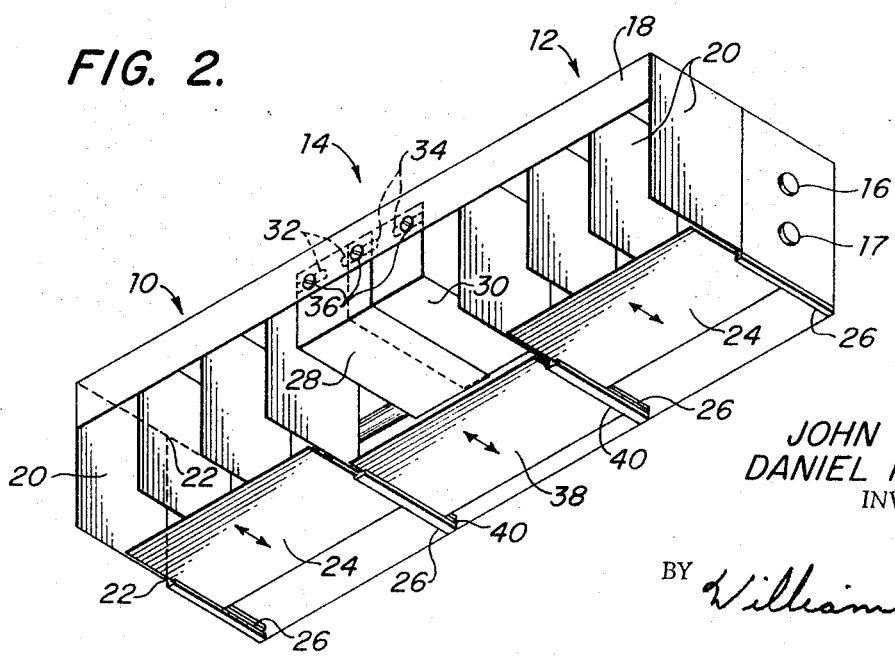
JOHN R. KANE
DANIEL ROBBINS
INVENTORS.
BY William C. Rock
AGENT.

SYSTEM FOR ILLUMINATING A LARGE MICROFILM COPY BOARD

BACKGROUND OF THE INVENTION

This invention relates to copying equipment for obtaining microfilm negatives of large engineering drawings, and more particularly pertains to an illumination system for the copying machine wherein a highly versatile distribution of illumination may be obtained.

In copying equipment of the type described herein, the prior art provided symmetrical positioning of several floodlights above the copy board. Both the distance of each light from the copy board and the position of each light relative to the copy board have been variable to create a desired lighting effect. Fluorescent lamps have also been used, but the low light output at each end of the lamp, the changing characteristics with age and the tendency of two or more lamps to dim unequally all have not been properly controlled in the prior art.

SUMMARY OF THE INVENTION

The invention sets forth a highly flexible and practical system for readily controlling the illumination intensity at various portions of a large copy board. The distribution of illumination must be controlled to compensate for the cosine fall-off effect in copying equipment. Also, different lenses have varying fall-off characteristics, the density of engineering drawings fluctuate, and the illumination characteristics of electric lights ordinarily change with age. The present invention provides a flexible illumination system by locating a lighting fixture at each end of the copy board and elevated above it. The location of the fixture beyond the end of the copy board avoids undesirable direct reflection of light into the lens. Each fixture is divided into three illumination zones along its length. The two end zones control the distribution of light between each edge and the center of the copy board. The center zone controls the intensity and distribution of light at the center of the copy board. Each zone also has baffling to control the distribution of illumination between the end and center of the copy board.

In a copying equipment, the cosine fall-off effect should be compensated for to obtain a satisfactory image of the material being copied. According to the cosine fall-off effect more illumination is required on the edges than in the center of the copy board to produce an image of the material on the edges of the same quality as the image of the material at the center of the copy board. The disclosed illumination system accomplishes this result by utilizing two lighting fixtures positioned at opposite ends of the copy board, and by blocking illumination emanating from the central section of each fixture and controlling the distribution of illumination from the end sections of each fixture. Vertical baffles are positioned in front of each end section to fully illuminate the edge of the copy board directly in the front of each end section and to only partially illuminate the central section of the copy board.

BRIEF DESCRIPTION OF THE DRAWINGS

FIG. 1 is a perspective drawing showing the copy board illumination system.

FIG. 2 is a schematic illustration of one lighting fixture taken forward and beneath the lighting fixture.

DESCRIPTION OF THE PREFERRED EMBODIMENT

FIG. 1 shows a perspective view of the copy board with the illumination system. Two lighting fixtures are provided elevated above each of the two end zones 5 and 6 of the copy board. In the interests of clarity, only one is illustrated. For reference purposes only, the remaining two sides of the copy board are referred to as edges 7 and 8. Each fixture is divided into three zones along its length, two end zones 10 and 12 and a center zone 14. A control panel 15 is also provided adjacent the copy board which among other things provides control for the intensity of illumination of the two fluorescent lights located in each fixture. For purposes of illustration a section of the copy board is shown as divided into zones, A—D.

FIG. 2 is an illustrative view of one of the lighting fixtures. The fixture contains two fluorescent lamps 16 and 17 which run along its length, and is divided into two end zones 10 and 12 and a center zone 14. Each of the end zones 10 and 12 have a plurality of vertical baffles 20 which control the distribution of illumination between the center and each edge of the copy board. The number of baffles would depend upon the desired application and on the depth of each baffle. For example, a greater number of baffles with a shallower depth would be required to block the same amount of light. These baffles are positioned so that centralized portions of the copy board receive light from bands of light which gradually increase in width as one proceeds from the edge of the copy board toward the center. Stated differently, a view from the center of the copy board at C would enable observation of a wider band of light from between those baffles located nearer the center of the copy board. This distribution of the illumination compensates for the cosine fall-off effect. In the preferred embodiment of the invention, the lighting fixture is constructed with the baffles 20 in stationary positions, the positions being designed such that the distribution of illumination is predeterminedly correct. In an alternative embodiment, the baffles 20 might be hinged at points 22 such that the illumination pattern may be readily adjusted at any time. A blinder 18 is constructed in the front upper portion of the fixture to prevent illumination from annoying the operator of the machine. Each of the end zones also has a horizontal baffle plate 24 located beneath it and this baffle is slidable forward relative to the fixture to adjust the distribution of illumination from the end to the center of the copy board. These baffles 24 are constructed to ride in tracks 26. The center section 14 of the fixture has two L-shaped baffles 28 and 30 which extend under the upper fluorescent light 16 and are attached to the blinder 18 via bolts 36. Each of the baffles 28 and 30 is constructed with elongated slots 32 in the forward face of the baffle 30 such that the baffles are adjustably slidable, one relative to the other, to control the total width of the two baffles 28 and 30 blocking the upper fluorescent lamp 16.

Center section 14 also has a horizontal baffle plate 38 positioned beneath it, and this baffle is slidable forward relative to the fixture in tracks 40.

OPERATION

Since the baffles 20 in the preferred embodiment are fixed in a stationary position, they set the basic illumination balance with which to work in setting up the illumination distribution. Referring to the zoned A through D in FIG. 1, the illumination ratio between C and D is initially set by controlling the intensity of the fluorescent lamps at control panel 15 and adjusting the baffles 28 and 30. The illumination ratio between A and C—D is then set by adjusting baffle 24. The illumination ration between B and C is set last by adjustment of baffle 38. Typical illumination values for a normal microfilm lens would be as follows: Area C would be illuminated at 15-foot candles, area D at 17-foot candles, area A at 20-foot candles and area B at 18½-foot candles. As mentioned previously, these illumination values are desired to compensate for the cosine fall-off effect in the copying equipment

What we claimed is:

1. An illumination system for a copy board, said copy board having two ends and two side edges, comprising:
    a. a first elongated lighting fixture located at one end of the copy board and elevated above it, said first fixture having at least one fluorescent lamp located therein and intensity control means for controlling the intensity of illumination emanating from said first fixture;
    b. a second elongated lighting fixture located at the other end of the copy board and elevated above it, said second fixture having at least one fluorescent lamp located therein and intensity control means for controlling the intensity of illumination emanating from said second fixture;

2. An illumination system for a copy board for enabling greater illumination of the edges of the copy board relative to the center of the copy board to compensate for the cosine fall-off effect in the copying equipment comprising:
   a. a first elongated lighting fixture having an elongated light source located at one end of the copy board and elevated above it;
   b. a second elongated lighting fixture having an elongated light source located at the other end of the copy board and elevated above it; and
   c. each of said first and second lighting fixtures being divided into three sections along its length, a central section and two end sections, each central section having means for blocking illumination emanating from the central section of the light source to reduce the amount of illumination on the center of the copy board, and each end section having a plurality of vertical baffles for controlling the distribution of illumination from each end of the light source to illuminate the edge of the copy board above which each end section is located and partially illuminate the center of the copy board, whereby the effect is to illuminate the center of the copy board less than the edges of the copy board and thereby compensate for the cosine fall-off effect in the copying equipment.

3. Apparatus as set forth in claim 2 wherein each lighting fixture includes means for controlling the light distribution between the end at which each lighting fixture is located and the center of the copy board.

4. Apparatus as set forth in claim 3 wherein each controlling means includes at least one horizontal baffle located beneath each lighting fixture, each baffle being slidable forward relative to the fixture.

5. Apparatus as set forth in claim 4 wherein each controlling means includes a separate horizontal baffle for said center section and each of said two end sections.

6. Apparatus as set forth in claim 2 wherein each of said elongated light sources is a fluorescent lamp, and intensity control means are provided for controlling the intensity of the illumination emanating from each fixture.

7. An illumination system for a copy board, said copy board having two ends and two side edges, comprising:
   a. a first elongated lighting fixture located at one end of the copy board and elevated above it;
   b. a second elongated lighting fixture located at the other end of the copy board and elevated above it; and
   c. said first and second lighting fixtures each having a first means, including a plurality of vertical baffles located along the length of each fixture, for controlling the light distribution between the center and each edge of the copy board, and a second means including at least one horizontal baffle located beneath each lighting fixture and slidable forward relative to the lighting fixture, for controlling the light distribution from the end at which each lighting fixture is located to the center of the copy board.

8. Apparatus as set forth in claim 7 wherein each lighting fixture includes two end sections, each end section having half of said plurality of vertical baffles.

9. Apparatus as set forth in claim 8 wherein each lighting fixture includes a center section between the two end sections which controls the illumination on the center of the copy board.

10. Apparatus as set forth in claim 8 wherein each lighting fixture includes means for controlling the light distribution from the end at which each fixture is located to the center of the copy board.

11. Apparatus as set forth in claim 10 wherein said controlling means includes a horizontal baffle located under each end section which is slidable forward relative to the lighting fixture.

12. Apparatus as set forth in claim 10 wherein each lighting fixture has at least one fluorescent lamp located therein, and intensity control means are provided for controlling the intensity of illumination emanating from each fixture.

13. Apparatus as set forth in claim 12 wherein each fixture has means for controlling the light distribution from the end at which each lighting fixture is located to the center of the copy board.

14. Apparatus as set forth in claim 13 wherein said controlling means includes a horizontal baffle located under each end section and under each center section, each baffle being slidable forward relative to the lighting fixture.

15. Apparatus as set forth in claim 14 wherein each lighting fixture has at least one fluorescent lamp located therein, and intensity control means are provided for controlling the intensity of illumination emanating from each fixture.

16. Apparatus as set forth in claim 15 wherein each lighting fixture has a top and bottom fluorescent lamp located therein, and each center section has two L-shaped baffles which extend rearward relative to the fixture and cover the top fluorescent lamp and wherein adjustment means are provided for said two L-shaped baffles for adjusting the area of the top fluorescent lamp which is blocked by the two L-shaped baffles.

17. Apparatus as set forth in claim 16 wherein each lighting fixture is located beyond the end of the copy board.

18. An illumination system for a copy board, said copy board having two ends and two side edges, comprising:
   a. a first elongated lighting fixture located at one end of the copy board and elevated above it, said first fixture having at least one elongated lamp located therein along its length and intensity control means for controlling the intensity of illumination emanating from said first fixture;
   b. a second elongated lighting fixture located at the other end of the copy board and elevated above it, said second fixture having at least one elongated lamp located therein along its length and intensity control means for controlling the intensity of illumination emanating from said second fixture;
   c. said first and second lighting fixtures each having a first means, including a plurality of vertical baffles located along the length of each fixture, for controlling the light distribution between the center and each edge of the copy board, and a second means for controlling the light distribution from the end at which each lighting fixture is located to the center of the copy board.